(12) United States Patent
Byard (10) Patent No.: US 12,203,494 B2
(45) Date of Patent: Jan. 21, 2025

(54) SHAFT LOCKOUT

(71) Applicant: Keith Byard, Newark, DE (US)

(72) Inventor: Keith Byard, Newark, DE (US)

(*) Notice: Subject to any disclaimer, the term of this patent is extended or adjusted under 35 U.S.C. 154(b) by 0 days.

(21) Appl. No.: 18/118,260

(22) Filed: Mar. 7, 2023

(65) Prior Publication Data

US 2023/0287911 A1   Sep. 14, 2023

Related U.S. Application Data

(60) Provisional application No. 63/268,992, filed on Mar. 8, 2022.

(51) Int. Cl.
| | | |
|---|---|---|
| *F16B 1/02* | (2006.01) | |
| *B25B 5/16* | (2006.01) | |
| *B25B 5/04* | (2006.01) | |

(52) U.S. Cl.
CPC ............... *F16B 1/02* (2013.01); *B25B 5/163* (2013.01); *B25B 5/04* (2013.01)

(58) Field of Classification Search
None
See application file for complete search history.

(56) References Cited

FOREIGN PATENT DOCUMENTS

CN    111360712 A   *   7/2020

* cited by examiner

*Primary Examiner* — Vicky A Johnson
(74) *Attorney, Agent, or Firm* — Invention To Patent Services; Alex Hobson (57) ABSTRACT

A shaft lockout has a clamp body that is configured to open and close for locating around a shaft of an electric machine. The clamp body has a clamp bottom portion and a clamp top portion that are hingeably coupled together and form a shaft aperture configured to extend around the shaft of the electric machine. An eyebolt extends between the clamp top portion and clamp top portion and has a bolt extension with bolt threads configured to receive a nut to secure the clamp body in a closed configuration. The shaft is restrained from rotating by a shaft set screw configured to thread into a set screw aperture in the clamp body to press against said shaft and a machine wedge screw configured to thread into a machine wedge aperture, also in the clamp body, and wedge against said electric machine.

20 Claims, 5 Drawing Sheets

Configure shaft lockout in a closed configuration around a shaft with the shaft aperture configured around said shaft Thread the nut onto the eyebolt to secure the clamp top portion to the clamp bottom portion Thread the shaft set screw through the set screw aperture to press against the shaft Thread the machine wedge screw through the machine wedge aperture to press against the machine

FIG. 10

SHAFT LOCKOUT

CROSS REFERENCE TO RELATED APPLICATIONS

This application claims the benefit of priority to U.S. provisional patent application No. 63/268,992 filed on Mar. 8, 2022; the entirety of which is hereby incorporated by reference herein.

BACKGROUND OF THE INVENTION

Field of the Invention

The present invention relates to shaft lockouts configured to extend around a shaft of a machine, such as an electrical motor or rotor shaft.

Background

Individuals that work on belt driven equipment are always at risk of injuring their fingers and hands. Even when the equipment is locked out electrically or mechanically, there is still opposing air that can make the belt driven apparatus rotate while working on it. As can be seen, there is a need for a lockout that can be used with electric machines, such as motors and rotors.

SUMMARY OF THE INVENTION

The invention is directed to shaft lockouts that may be used by mechanics and other individuals when changing belts on belt driven fans, so as to decrease injuries to hands due to uncontrollable forces. An exemplary shaft lockout comprises a clamp body that is configured to open and close for locating around a shaft of an electric machine, such as an electric motor. The clamp body has a clamp bottom portion and a clamp top portion that are hingeably coupled together and form a shaft aperture configured to extend around the shaft of a machine, such as an electric machine, motor or rotor shaft, when in a closed configuration. The shaft lockout has an eyebolt that extends between the clamp top portion and clamp bottom portion and has a bolt extension with bolt threads configured to receive a nut to secure the clamp top portion to the clamp bottom portion when in a closed configuration. The shaft is restrained from rotating by a combination of a shaft set screw configured to thread into a set screw aperture in the clamp body to press against said shaft and a machine wedge screw configured to thread into a machine wedge aperture, also in the clamp body, and wedge against said electric machine. The shaft is secured to the shaft lockout by the shaft set screw and the shaft lockout is restrained from movement by the machine wedge screw. The machine wedge aperture in the clamp body extends at an offset angle to a length plane of the clamp body to direct the machine wedge screw out of the clamp body and into the machine, such as into the housing of the machine. Put another way, the machine wedge aperture extends from the top of the clamp top portion to the machine side of the clamp top portion. This configuration of the machine wedge screw extending at an offset angle more securely retains the shaft lockout from rotation with respect to the machine.

The clamp body forms a shaft aperture configured to extend around the shaft of the electric machine when in a closed configuration. The shaft aperture may extend in a radius of curvature that is substantially the same as the shaft diameter, or within about 10% of the shaft diameter to enable a tight fit around the shaft. The clamp bottom portion and clamp top portion may be coupled together by a pin to enable rotation or pivoting of the two components from a closed configuration to an open configuration. The clamp top portion and clamp bottom portion pivot or rotate about a pivot axis, extending in a direction parallel with the pins and move along the length plane that is orthogonal to the pivot axis. A hinge plate or pair of hinge plates may be configured between clamp bottom portion and the clamp top portion and provide a gap or space for movement and rotation of the clamp bottom portion and the clamp top portion, which may aid in positioning and clamping of the clamp body to a shaft. A pair of hinge plates may ensure that the clamp components, the clamp top portion and clamp bottom portion, pivot in a more controlled rotation or pivoting motion about a pivot axis, as opposed to a single hinge plate that may enable movement out of the length plane. The hinge plate may have a first pin aperture to receive a first pin extending through the clamp top portion and a second pin aperture to receive a second pin extending through the clamp bottom portion.

The clamp top portion and clamp bottom portion of the shaft lock may be secured together in a closed configuration by an eyebolt that extends between the two components having a bolt extension with bolt threads configured to receive a nut to secure the clamp top portion to the clamp bottom portion. The eye of the eye bolt may form a pin aperture to receive a pin that extends through the clamp body. The nut may thread down onto the extended end of the bolt extension and may secure an elongated washer to the clamp body. The elongated washer may extend across extensions of the clamp body, wherein the bolt extension extends up through a gap in the clamp body extensions.

An exemplary clamp body of a shaft lock may be secured together a first pin extending through the clamp top portion and through an aperture in the hinge plate, a second pin extending through the clamp bottom portion and through a second aperture in the hinge plate, and a third pin extending through the clamp bottom portion and through a pin aperture of the eyebolt, such as the eye of the eyebolt. The clamp body or shaft lock has a hinge end about which the clamp body pivots open and closed and a lock end opposite the hinge end and comprising the eyebolt that extends from the clamp bottom portion to the clamp top portion.

The machine wedge screw extends through the machine wedge aperture at an offset angle to the length plane to extend the extended end of the machine wedge screw out from the machine side of the clamp body to press against the machine to wedge against the machine and prevent movement of the shaft lock with respect to the machine. The offset angle of the machine wedge aperture and the machine wedge screw extending therethrough with respect to the length plane may be ay be about 10 degrees or more, about 15 degrees or more, about 25 degrees or more, about 35 degrees or more, or from about 10 degrees to about 35 degrees, or no more than about 60 degrees and any other range between and including the values provided. Note that too large of an offset angle may be difficult configure in the clamp body.

A method of locking out a shaft included providing the shaft lock as described herein that is configured around a shaft of an electric machine. The clamp body is closed about the shaft and the nut is threaded down onto the extended end of the eyebolt to secure the clamp body in a closed configuration. The shaft set screw is then threaded down into the set screw aperture to press the extended end of the shaft set screw against the shaft. The machine wedge screw is also threaded into the wedge screw aperture to extend the extended end against the electric machine to wedge the shaft lock to the electric machine and prevent the shaft from rotating.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Broadly, an embodiment of the present invention provides a mechanical shaft lockout. The present invention solves the dangers associated with unforeseen shaft rotation by allowing an individual to install a lockout device either on the motor/rotor shaft and continue to work on the equipment without risk of injury. The features of the present invention result in a level of safety/protection that otherwise does not exist.

Referring now to FIGS. 1-9, the shaft lockout 11 may include a clamp body 80 including a clamp top portion 10 and a clamp bottom portion 12, and hinge plates 14, 14', an eyebolt 16, a nut 18, such as a wing nut, pins 20, 20', 20", star washers 22, 22', an elongated washer 24, shaft set screw 26 and machine wedge screw 27. The shaft lockout 11 is configured to form a shaft aperture 13 that extends around a shaft 30 of an electric machine 28, such as an electric motor or rotor. The shaft set screw 26 is configured to thread into the set screw aperture 75 and onto the shaft 30 of the electric machine 28 and the machine wedge screw 27 is configured to thread into the machine wedge aperture 76 and out of the machine side 87 of the clamp body 80 and press against the electric machine 28 to secure the shaft 30 and prevent rotation of the shaft.

An exemplary shaft lockout 11 includes a clamp body 80 configured to extend around a shaft 30 of an electric machine 28 and includes a clamp top portion 10 and clamp bottom portion 12. The clamp top portion 10 is hingeably coupled to the clamp bottom portion 12 via hinge plates 14, 14'. Pins 20, 20' extend through the pin apertures 72, 72', respectively, in the clamp top portion 10 in the clamp bottom portion 12 and through the apertures in the hinge plates 14, 14' to rotatably couple the clamp top portion 10 to the clamp bottom portion 12. The hinge plates 14, 14' are configured on the hinge end 40 of the shaft lockout 11. The clamp top portion 10 and clamp bottom portion 12 pivot or rotate about a pivot axis 92, extending in a direction parallel with the pins 20, 20' and move along a length plane 90 that is orthogonal to the pivot axis. A length plane is a plane extending from the hinge end 40 to the lock end 60 of the clamp body 80.

Figure 1:
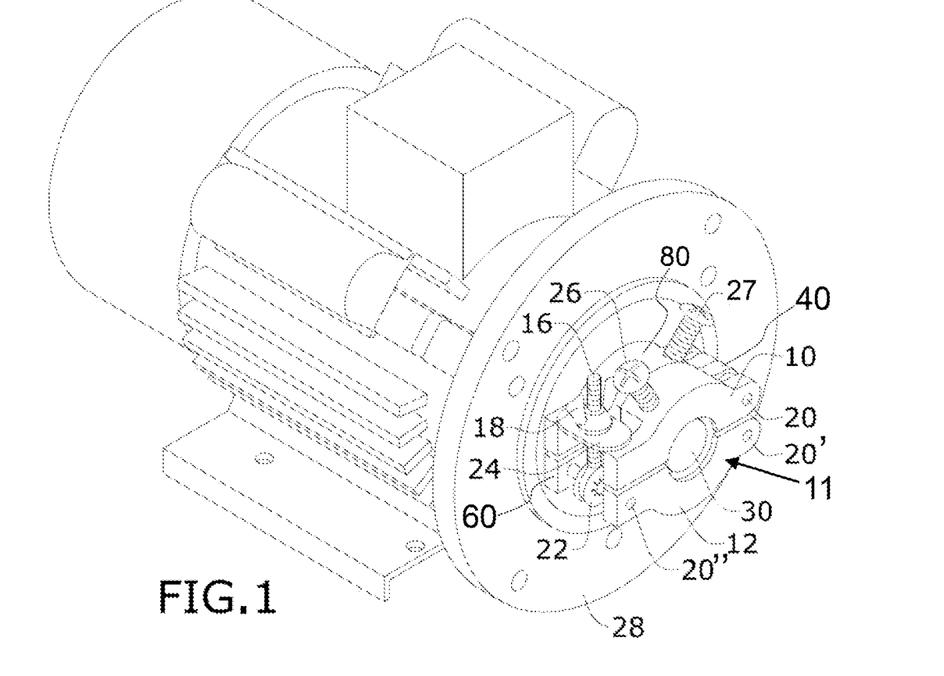
FIG. 1 shows a perspective view of an electric machine with an exemplary shaft lockout engaged upon the shaft of the electric machine.
Figure 2:
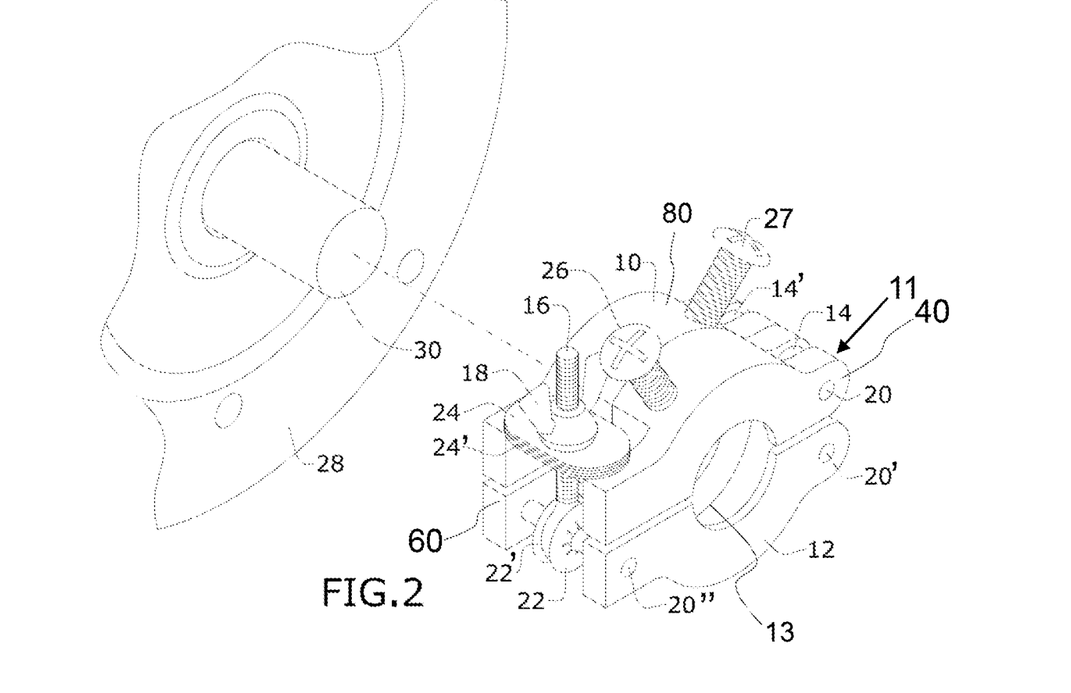
FIG. 2 shows a perspective view of the electric machine shown in FIG. 1, with the shaft lockout detached from the shaft of the electric machine.
Figure 3:
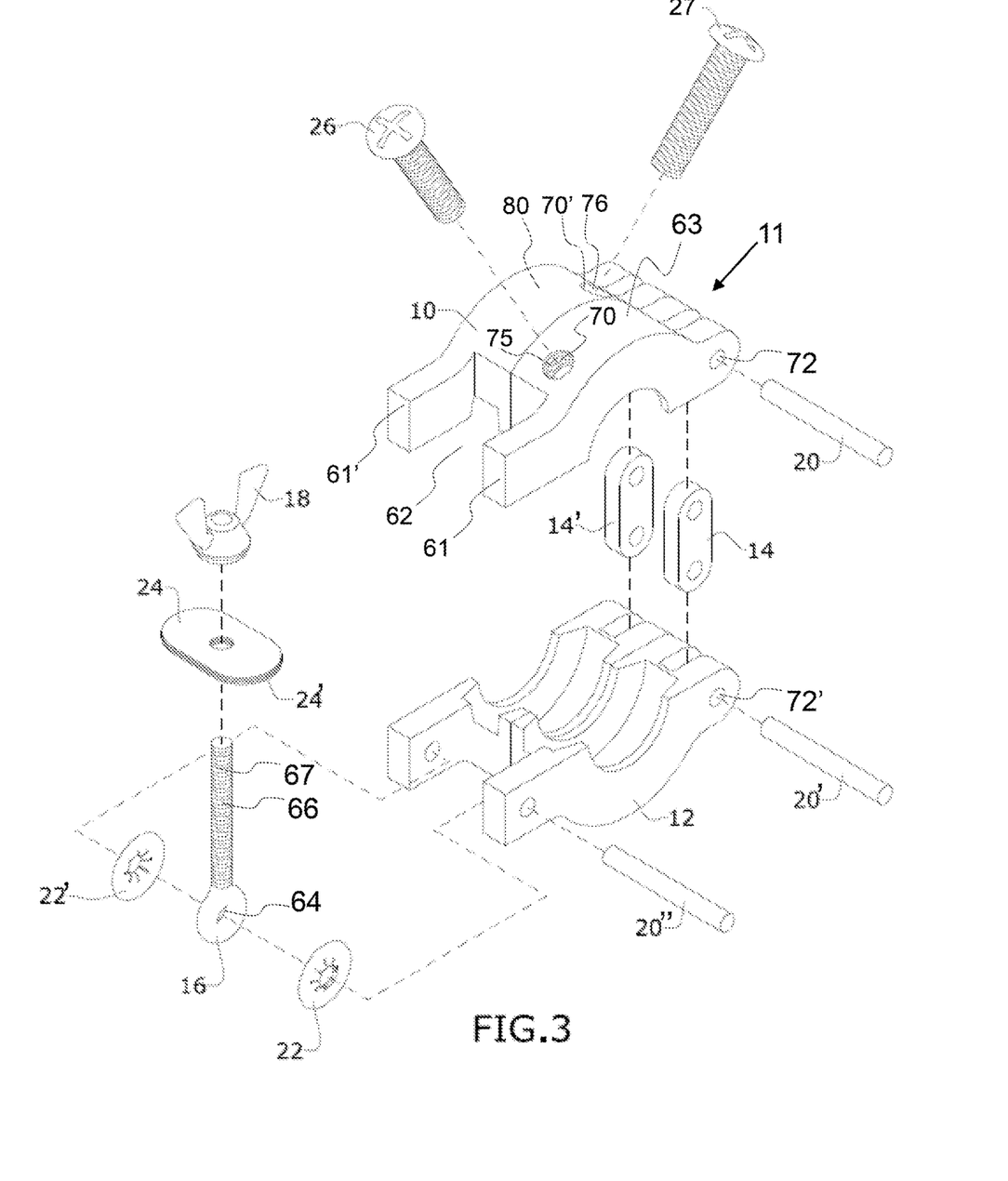
FIG. 3 shows an exploded view of the exemplary shaft lockout.

A lock end 60 of the shaft lockout 11 is configured opposite the hinge end 40 and is configured to lock the shaft lockout 11 down in a locked configuration around a shaft 30 of an electric machine 28. The lock end 60 includes an eyebolt 16 having a pin aperture 64 and a bolt extension 66 with bolt threads 67 configured to receive the nut 18, a wing nut as shown for hand tightening. The bolt extension extends up through the slot 62 in the clamp top portion 10 between the extensions 61, 61' of the clamp top portion 10, as shown in FIG. 3. Pin 20" is configured to extend through the apertures in the clamp bottom portion 12, through star washers 22, 22' and through the pin aperture 64 of the eyebolt 16 to secure the eyebolt to the clamp bottom portion 12. The star washers 22, 22' are configured between the eyebolt 16 and extensions of the clamp bottom portion 12. Elongated washers 24, 24' are configured to extend over the extended end of the eyebolt and a nut 18, such as a wing nut, is configured to thread onto the bolt threads 67 to tighten the clamp top portion 10 to the clamp bottom portion 12, as best shown in FIG. 3. The star washers 22, 22' are configured to retain the bolt extension in an orientation extending toward the clamp top portion 10.

Figure 8:
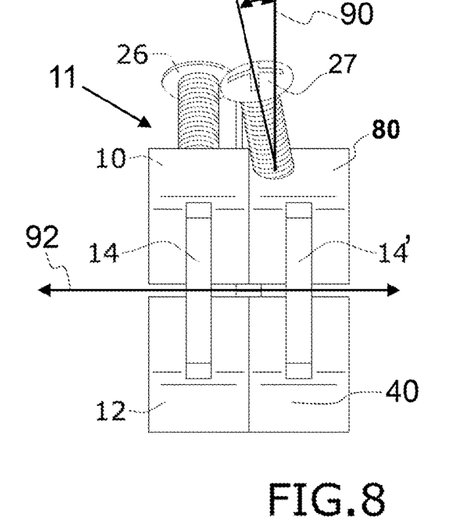
FIG. 8 shows a right side view of the shaft lockout.
Figure 9:
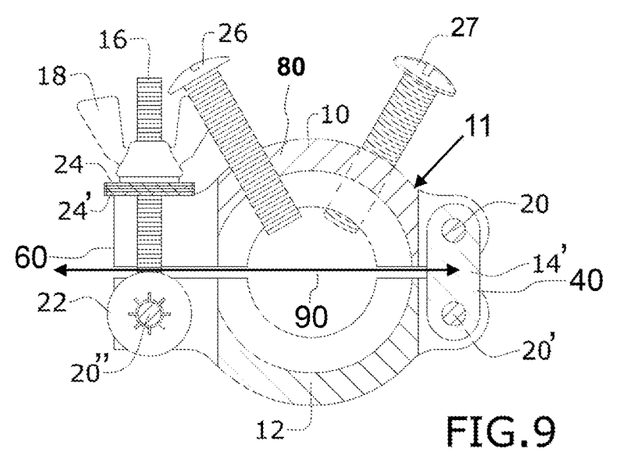
FIG. 9 shows a section view of the shaft lockout taken along line 9-9 from FIG. 6.

The shaft set screw 26 and the machine wedge screw 27, which may be screws or bolts, are configured to thread into the threads of the threaded lockout apertures 70, 70' in the clamp body 80, such as the clamp top portion 10 to press against a shaft 30 of the motor, in use. The shaft set screw 26 is configured to thread into set screw aperture 75 and the machine wedge screw 27 is configured to thread into the machine wedge aperture 76, as shown in FIG. 3. The shaft set screw 26 is configured to thread into set screw aperture 75 to press the extended end of the set screw against the shaft 30 of the electric machine 28 and the machine wedge screw 27 is configured at an offset angle to the length plane 90 and is configured to thread out from the clamp body to create a wedge between the shaft lockout 11 and the electric machine to prevent rotation of the shaft 30. This offset angle 96 of the machine wedge aperture 76 and resulting machine wedge screw 27 threaded therein is shown in FIG. 8 with respect to the length plane 90. As described herein, this offset angle may be about 15 degrees or more, about 25 degrees or more, about 35 degrees or more, or from about 10 degrees to about 35 degrees and any other range between and including the values provided. Note that too large of an offset angle may be difficult to configure in the clamp body. The machine wedge aperture 76 extends from the outer surface 63 of the clamp top portion 10 to the machine side 87 of the clamp top portion 10. Also, the shaft 30 of the electric machine 28 may have a flat or planar portion that enables the shaft set screw to wedge against this planar portion to prevent rotation of the shaft with the machine wedge screw wedged against the electric machine.

Figure 4:
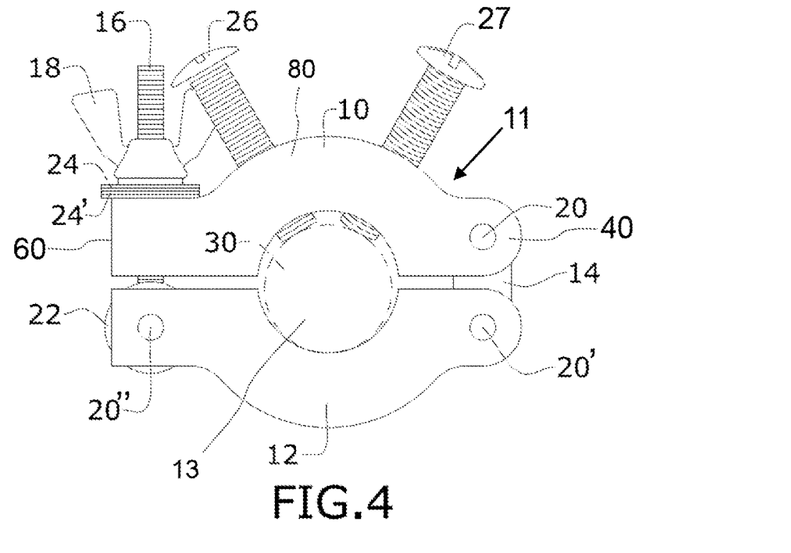
FIG. 4 shows a front view of the exemplary shaft lockout shown in a closed position.
Figure 5:
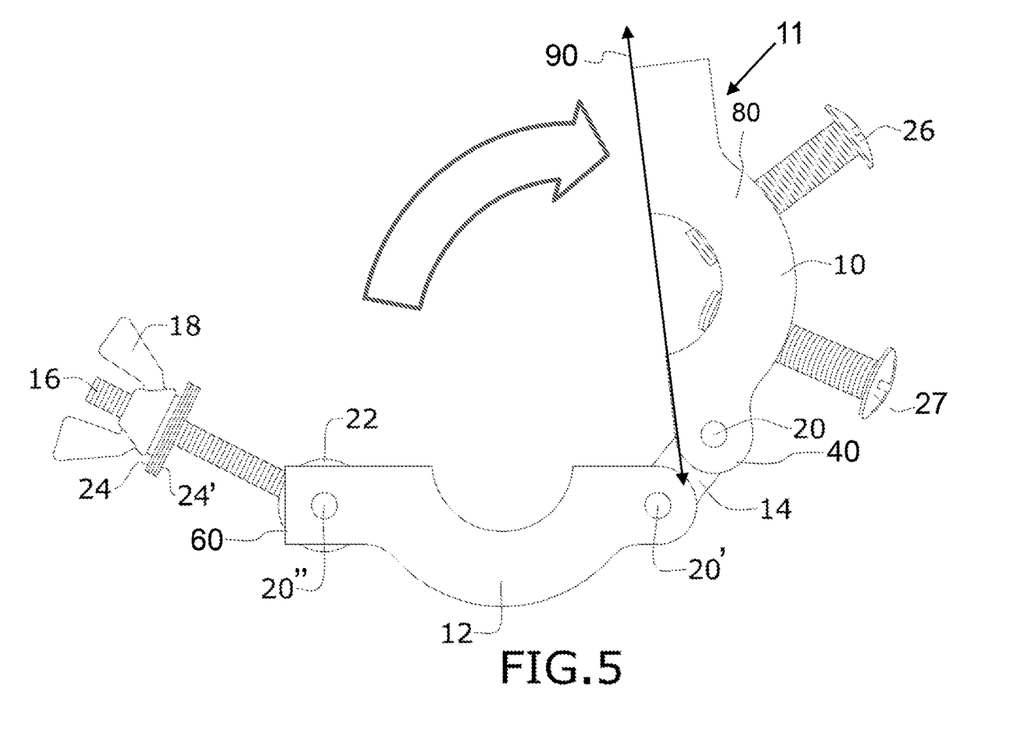
FIG. 5 shows a front view of the shaft lockout shown in an open position.
Figure 6:
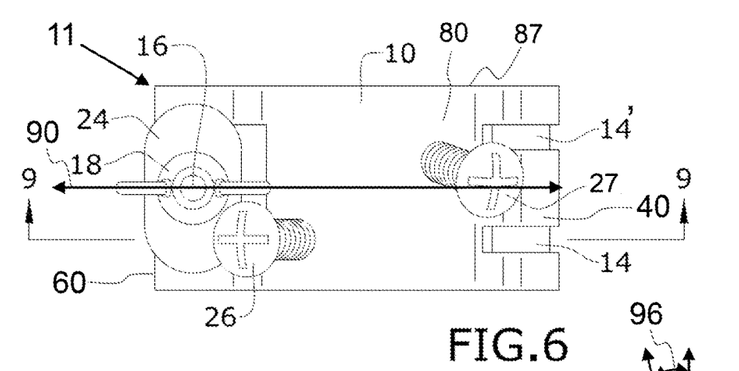
FIG. 6 shows a top view of the shaft lockout.
Figure 7:
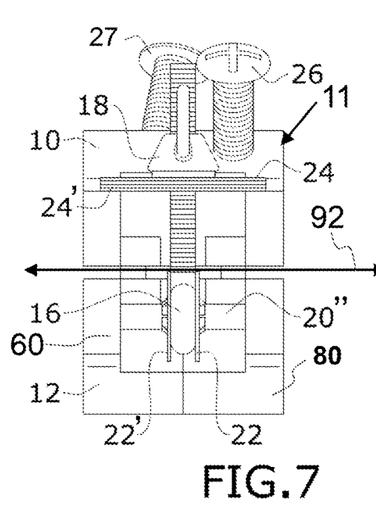
FIG. 7 shows a left side view of the shaft lockout.

As shown in FIGS. 4 and 5, the shaft lockout 11, rotates or pivots from a closed configuration, as shown in FIG. 4, to an open configuration, as shown in FIG. 5. The clamp body 80 opens to enable locating the shaft lockout onto a shaft of an electric machine and for removing from said shaft. The clamp top portion 10 pivots about the pin 20 and the clamp bottom portion 12 pivots or rotates about the pin 20'. The hinge plate 14 may also pivot between the two pins 20, 20'.

The nut 18 is threaded down onto the bolt threads of the eyebolt 16 to press down elongated washers 24, 24' on an upper surface of the clamp top portion 10 when in use. This is generally shown in FIG. 4. In this position, the clamp is maintained in a closed position around a shaft 30. This, in combination with the engagement of the shaft set screw 26 and the with the shaft 30 and the machine wedge screw 27 wedged against the electric machine 28, prevents rotation of the shaft 30.

Figure 10:
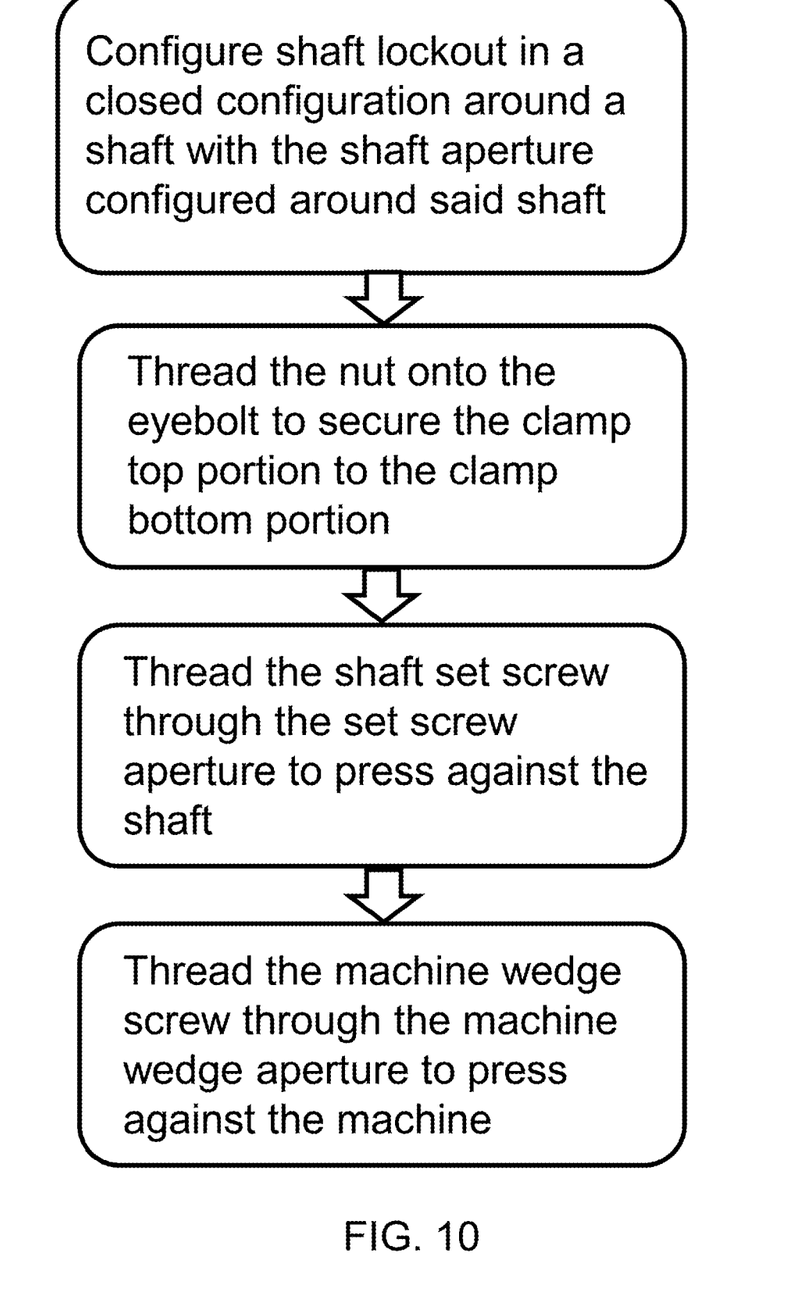
FIG. 10 shows a diagram of the method of locking out a shaft using an exemplary shaft lockout described herein.

As shown in FIG. 10, a method of locking out a shaft using an exemplary shaft lockout described herein includes configuring the shaft lockout in a closed configuration around the shaft of a machine. The clamp top portion and clamp bottom portion may be pivoted closed about the shaft to configure the shaft aperture of the shaft lockout around the shaft of the machine. The clamp body can then be secured in a closed configuration by threading the nut, such as a wing nut onto the bolt threads of the eyebolt. An elongated washer may be used to secure the clamp top portion to the clamp bottom portion. The shaft set screw and machine wedge screw may be threaded into their respective threaded apertures in the clamp body. The shaft set screw may be threaded into the set screw aperture to press against the shaft and the machine wedge screw may be threaded into the machine wedge aperture to press against the machine to secure the shaft to the shaft lockout and to secure the shaft lockout from rotation with respect to the machine.

In certain embodiments, and for example, first KF16 stainless steel vacuum clamp and second KF16 stainless steel vacuum clamp may be welded together using stainless steel mig welding wire. A 5 mm dowel pin may be used to join the hinged end of the part and a 5 mm dowel pin may be used with an M5 internal tooth starlock washer and stainless-steel oval washers to secure the threaded pin that helps close the tool tight.

Those with skill in the art will appreciate that various modifications may be made that are within the spirit and scope of the present disclosure. For example, various angles and dimensions may be modified to improve performance or accommodate different use cases. Other components may be substituted for similarly performing structure. For example, the star lock washers may be substituted with a more permanent firm hold of the threaded spindle. Further, other structure may be used to lock the clamp tool in place, such as a clip.

In an exemplary embodiment, the shaft lockout may be used as follows. After a worker locks out the motor or device electrically or mechanically of the belt driven device, they should then gain access to the shaft. Afterwards, they can take the presently described shaft lockout and open it up and place it over the shaft. Next, they can close the shaft lockout and secure it with the nut. Next, they can tighten the shaft set screw and then tighten the set screw that wedges against the electric machine.

Those with skill in the art will appreciate that the present invention may be used as a safety to lock out any rotating equipment.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims directed to the present invention.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A shaft lockout for a shaft of an electric machine comprising:
   a) a clamp body comprising:
      i) a clamp bottom portion;
      a clamp top portion that is hingeably coupled to said claim bottom portion;
      wherein the clamp body is configured to pivot about a pivot axis from an open configuration to a closed configuration, and wherein said closed configuration the clamp body is configured to extend around said shaft of said electric machine;
      iii) a set screw aperture that is threaded;
      iv) a machine wedge aperture that is threaded and configured at an offset angle of at least 10 degrees to a length plane of the clamp body;
   b) a nut;
   c) an eyebolt coupled to the clamp bottom portion and having a bolt extension with bolt threads configured to receive said nut to secure the clamp top portion to the clamp bottom portion in said closed configuration;
   d) a shaft set screw configured to thread into said set screw aperture to press against said shaft;
   e) a machine wedge screw configured to thread into said machine wedge aperture and wedge against said electric machine;
   wherein said shaft is prevented from rotating by the shaft set screw pressing against said shaft with the machine wedge screw pressing against the electric machine.

2. The shaft lockout of claim 1, wherein the clamp top portion is coupled to the clamp bottom portion by a pin.

3. The shaft lockout of claim 1, further comprising a hinge plate extending between the clamp top portion and the clamp bottom portion, wherein the clamp top portion pivots about the hinge plate.

4. The shaft lockout of claim 3, wherein the hinge plate is coupled to the clamp top portion by a first pin and coupled to the clamp bottom portion by a second pin.

5. The shaft lockout of claim 4, comprising two hinge plates, each coupled to and extending between the clamp top portion and the clamp bottom portion and wherein each is coupled to the clamp top portion by said first pin and coupled to the clamp bottom portion by said second pin.

6. The shaft lockout of claim 1, wherein the eyebolt is coupled to the clamp body by a pin that extends through a pin aperture of the eyebolt.

7. The shaft lockout of claim 6, wherein the eyebolt is coupled to the clamp body by said pin extending through the clamp bottom portion and through said pin aperture of the eyebolt.

8. The shaft lockout of claim 1, further comprising a washer configured between the clamp body and the eyebolt.

9. The shaft lockout of claim 8, further comprising a pair of washers configured between the clamp body and the eyebolt, wherein a first washer is configured on a first side of the eyebolt and a second washer of the pair of washers is configured on a second and opposing side of the eyebolt.

10. The shaft lockout of claim 1, further comprising an elongated washer that is configured between the nut and the clamp body.

11. The shaft lockout of claim 1, further comprising an elongated washer that is configured between the nut and the clamp top portion, and wherein the eyebolt is coupled to the clamp bottom portion by a pin that extends through a pin aperture of the eyebolt.

12. The shaft lockout of claim 1, wherein the offset angle of the machine wedge aperture is at least 20 degrees from said pivot axis.

13. The shaft lockout of claim 1, wherein the nut is a wing nut.

14. A shaft lockout for a shaft of an electric machine comprising:
   a) a clamp body comprising:
      i) a clamp bottom portion;
      ii) a clamp top portion that is hingeably coupled to said claim bottom portion;
      wherein the clamp body is configured to pivot about a pivot axis from an open configuration to a closed configuration, and wherein said closed configuration the clamp body is configured to extend around said shaft of said electric machine;
      iii) a set screw aperture that is threaded;
      iv) a machine wedge aperture that is threaded and configured at an offset angle of at least 10 degrees to a length plane of the clamp body;
   b) a hinge plate extending between the clamp top portion and the clamp bottom portion;
   wherein the clamp top portion pivots about the hinge plate; and
   the hinge plate is coupled to the clamp top portion by a first pin and coupled to the clamp bottom portion by a second pin;
   c) a nut;
   d) an eyebolt coupled to the clamp bottom portion, said eyebolt comprising:
      i) a bolt extension with bolt threads configured to receive said nut to secure the clamp top portion to the clamp bottom portion in said closed configuration;
      ii) a pin aperture;
      wherein the eyebolt is coupled to the clamp body by a pin that extends through the clamp bottom portion and through said pin aperture of the eyebolt;
   e) an elongated washer that is configured between the nut and the clamp body with the clamp body in said closed configuration;
   f) a shaft set screw configured to thread into said set screw aperture to press against said shaft;
   g) a machine wedge screw configured to thread into said machine wedge aperture and wedge against said electric machine;
   wherein said shaft is prevented from rotating by the shaft set screw pressing against said shaft with the machine wedge screw pressing against said electric machine.

15. The shaft lockout of claim 14, comprising two hinge plates, each coupled to and extending between the clamp top portion and the clamp bottom portion and wherein each is coupled to the clamp top portion by said first pin and coupled to the clamp bottom portion by said second pin.

16. A method of locking out a shaft of an electric machine comprising:

a) providing the shaft lockout of claim 1:
b) opening the clamp body and configuring the clamp body around said shaft of said electric machine;
c) closing the clamp body around said shaft of said electric machine by rotating at least one of the clamp bottom portion and clamp top portion;
d) threading the nut onto the bolt threads of the bolt extension of the eyebolt to secure the clamp top portion to the clamp bottom portion;
e) threading the shaft set screw into said set screw aperture to press said shaft set screw against said shaft;
f) threading the machine wedge screw into said machine wedge aperture to wedge said machine wedge screw against said electric machine.

17. The method of claim 16, wherein the clamp top portion is coupled to the clamp bottom portion by a pin.

18. The method of claim 16, further comprising a hinge plate extending between the clamp top portion and the clamp bottom portion, wherein the clamp top portion pivots about the hinge plate.

19. The method of claim 18, wherein the hinge plate is coupled to the clamp top portion by a first pin and coupled to the clamp bottom portion by a second pin.

20. The method of claim 19, comprising two hinge plates, each coupled to and extending between the clamp top portion and the clamp bottom portion and wherein each is coupled to the clamp top portion by said first pin and coupled to the clamp bottom portion by said second pin.

\* \* \* \* \*